(12) United States Patent
Muralidharan et al.

(10) Patent No.: US 12,260,767 B2
(45) Date of Patent: Mar. 25, 2025

(54) SMART AIRCRAFT TOWING SYSTEM

(71) Applicant: Goodrich Corporation, Charlotte, NC (US)

(72) Inventors: Santhosh Muralidharan, Bangalore (IN); Suhas Venkata Prithvi Gorthi, Rajahmundry (IN); Manjunatha Kamala, Bangalore (IN); Prashant Kokati, Bangalore (IN); Vishwas Bantanahal, Bangalore (IN); Ashutosh Kumar Jha, Bangalore (IN); Vishwanath Gurushankar, Bangalore (IN); Srikant Mahor, Bangalore (IN); Raghavendra Horeyala Gopala, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 57 days.

(21) Appl. No.: 18/087,560

(22) Filed: Dec. 22, 2022

(65) Prior Publication Data

US 2024/0161639 A1 May 16, 2024

(30) Foreign Application Priority Data

Nov. 15, 2022 (IN) .............................. 202241065401

(51) Int. Cl.
*G08G 5/00* (2006.01)
*B64D 45/00* (2006.01)
(Continued)

(52) U.S. Cl.
CPC .............. *G08G 5/06* (2013.01); *B64D 45/00* (2013.01); *B64F 1/225* (2013.01)

(58) Field of Classification Search
USPC ....... 340/945, 948, 950, 967, 971, 973, 975, 340/987, 995.27, 438, 436, 435
See application file for complete search history.

(56) References Cited

U.S. PATENT DOCUMENTS 5,915,649 A * 6/1999 Head ........................ B64C 37/00
244/17.17
6,305,484 B1 * 10/2001 Leblanc .................... B64F 1/22
180/167
(Continued)

FOREIGN PATENT DOCUMENTS

EP 3248885 11/2017
EP 3219624 11/2019
(Continued)

OTHER PUBLICATIONS

European Patent Office, European Search Report dated Feb. 12, 2024 in Application No. 23209472.2.

*Primary Examiner* — Daniel Previl
(74) *Attorney, Agent, or Firm* — SNELL & WILMER L.L.P.

(57) ABSTRACT

A method is disclosed here. The method includes receiving an input from an aircraft, determining a towing status of the aircraft based on the input, and sending a message to a transmitter to transmit the towing status of the aircraft. Also disclosed herein is a system including an aircraft including a nose landing gear, a first controller, and a transmitter, wherein the first controller is configured to determine a towing status of the aircraft based on a number of sensor signals received from the aircraft, and the transmitter is configured to transmit the towing status and a tow truck configured to tow the aircraft, the tow truck including a second controller and a receiver, wherein the receiver is configured to receive the towing status from the transmitter, and the second controller is configured to provide an indication of the towing status of the aircraft.

19 Claims, 7 Drawing Sheets

(51) Int. Cl.
*B64F 1/225* (2024.01)
*G08G 5/06* (2006.01)

(56) References Cited

U.S. PATENT DOCUMENTS

| | | | |
|---|---|---|---|
| 8,660,711 | B2 | 2/2014 | Bailbe et al. |
| 9,847,036 | B2* | 12/2017 | Colmenares ............ G08G 5/065 |
| 9,981,738 | B2* | 5/2018 | Di Zazzo ................ B64D 47/02 |
| 2009/0171714 | A1* | 7/2009 | Muller ........... G06Q 10/063114 |
| | | | 705/7.15 |
| 2011/0036939 | A1* | 2/2011 | Easter ..................... B64C 37/00 |
| | | | 244/46 |
| 2011/0073388 | A1 | 3/2011 | Andres et al. |
| 2013/0008998 | A1* | 1/2013 | Morris ................ B64U 2201/20 |
| | | | 244/17.11 |
| 2016/0294882 | A1* | 10/2016 | Michaels ............ H04L 65/1013 |
| 2017/0305214 | A1* | 10/2017 | Gray ........................ B60P 3/11 |
| 2019/0228599 | A1* | 7/2019 | Hrib ........................ G07C 5/085 |
| 2021/0107634 | A1* | 4/2021 | Forghani .................. B64C 25/48 |
| 2021/0107683 | A1* | 4/2021 | Van Deventer .......... B64F 1/002 |
| 2021/0261271 | A1* | 8/2021 | Zhang ..................... B60D 1/242 |
| 2022/0067542 | A1* | 3/2022 | Plawecki .................. G06N 5/04 |
| 2022/0097868 | A1* | 3/2022 | Schmidt .................. B64F 1/228 |
| 2023/0053453 | A1* | 2/2023 | Ziv Av ................... G08G 5/065 |

FOREIGN PATENT DOCUMENTS

| | | |
|---|---|---|
| FR | 2937777 | 4/2010 |
| WO | 2007110266 | 10/2007 |
| WO | 2010061384 | 6/2010 |
| WO | 2022046765 | 3/2022 |

* cited by examiner

SMART AIRCRAFT TOWING SYSTEM

CROSS-REFERENCE TO RELATED APPLICATIONS

This application claims priority to, and the benefit of, India Patent Application No. 202241065401 (DAS CODE: F36B), filed Nov. 15, 2022 and titled "SMART AIRCRAFT TOWING SYSTEM," which is incorporated by reference herein in its entirety for all purposes.

FIELD

The present disclosure generally relates towing aircraft and, more particularly, to systems and methods for improving the safety of towing aircraft.

BACKGROUND

The aviation industry has seen dramatic growth over the last 20 years with passenger count increasing almost threefold in recent years. Airlines are preparing to serve more passengers and at the same time are modernizing their fleet by adding/acquiring new generation aircraft to help suit their business objectives. While the number of aircraft are on the rise, the amount of maintenance that is associated with keeping an aircraft flying has also increased. One of the repetitive tasks that is carried out often is the towing service. The aircraft engines are generally not on when moving the aircraft short distances on the ground, such as for maintenance. Towing is the assisted movement of an aircraft using the power of a specialized ground vehicle like tractor or tugs attached to the nose landing gear. In some cases, the towing vehicles are attached using tow bars and in some cases the towing vehicles are bar-less, and a hydraulic system is used to lift the nose wheels.

If done carelessly, towing operation can cause damage to the aircraft and injury to personnel. Towing accidents not only result in aircraft damage but also delay or cancel flights and lead to other airport disruptions. There are numerous failures reported due to improper towing practices in an aircraft. The cost incurred due to failure of landing gear during towing mission can be high. Additionally, improper towing of an aircraft can lead to secondary loading in the nose landing gear components which can eventually lead to failure during the operational lifetime of the aircraft. One of the primary reasons for improper towing practices is the lack of communication between the aircraft cockpit and towing vehicle.

SUMMARY

A method for improving the safety of towing aircraft is disclosed herein. The method includes receiving, by a processor, an input from an aircraft, determining, by the processor, a towing status of the aircraft based on the input, and sending, by the processor, a message to a transmitter to transmit the towing status of the aircraft.

In various embodiments, the method further includes reading, by the processor, a configuration file associated with the aircraft and identifying, by the processor, before the determining, a number of sensor inputs to be received based on the configuration file, wherein the input includes the number of sensor inputs. In various embodiments, the input includes a parking brake sensor input, a torque link sensor input, and a nose wheel steering sensor input. In various embodiments, the sending the message further includes identifying, by the processor, a first recipient of the towing status and a second recipient of the towing status and sending, by the processor, a message to transmit the towing status to the first recipient and the second recipient.

In various embodiments, the first recipient is a tow truck controller and the second recipient an air traffic controller (ATC) controller. In various embodiments, the method further includes receiving, by the processor, a request to subscribe to the towing status of the aircraft, and determining, by the processor, to send the message in response to the request to subscribe. In various embodiments, the transmitter is a wireless transmitter.

Also disclosed herein is a system for communicating aircraft status for towing. The system includes an aircraft including a nose landing gear, a first controller, and a transmitter, wherein the first controller is configured to determine a towing status of the aircraft based on at least one sensor signal received from the aircraft, and the transmitter is configured to transmit the towing status to a receiver associated with a tow truck configured to tow the aircraft.

In various embodiments, the tow truck includes a second controller, wherein the receiver is configured to receive the towing status from the transmitter, and the second controller is configured to provide an indication of the towing status of the aircraft, the second controller is further configured to subscribe to the first controller to receive the towing status, and the transmitter is configured to transmit the towing status to subscribed receivers. In various embodiments, the second controller is further configured to prevent movement of the tow truck in response the towing status indicating the aircraft is not ready to be towed. In various embodiments, the second controller is further configured to allow movement of the tow truck in response to the towing status indicating the aircraft is ready to be towed.

In various embodiments, the tow truck further includes a display configured to display the towing status received from the second controller. In various embodiments, the system further includes a third controller including a receiver, the third controller configured to receive the towing status from the aircraft. In various embodiments, the receiver is configured to pair with the transmitter.

Also disclosed herein is a system including an aircraft including a plurality of sensors, a transmitter, a processor, and a memory operatively coupled to the processor. The memory includes instructions stored thereon that, when executed by the processor, cause the processor to receive an input from the plurality of sensors, determine a towing status of the aircraft based on the input, and send a message to the transmitter to transmit the towing status of the aircraft.

In various embodiments, the instructions, when executed by the processor, further cause the processor to read a configuration file associated with the aircraft and identify, before the determining, a subset of the plurality of sensors to use to determine the towing status, the subset of the plurality of sensors being based on the configuration file. In various embodiments, the plurality of sensors includes a parking brake sensor input, a torque link sensor input, and a nose wheel steering sensor input. In various embodiments, the instructions, when executed by the processor, further cause the processor to identify a recipient of the towing status based on a list of subscribers and transmit the towing status to the recipient.

In various embodiments, the aircraft further includes a towing status indicator, and the instructions, when executed by the processor, further cause the processor to send a signal including the towing status to the towing status indicator. In various embodiments, the towing status indicator is a liquid crystal display or a light emitting diode.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a communication system for facilitating improved communication between an aircraft or aircraft pilot and a tow vehicle during a towing operation. The communication system reduces the occurrence of towing incidents during towing operations and thereby reduces maintenance costs that may be incurred due to poor towing practices. Poor towing practice may include towing while the aircraft parking brake is engaged, the torque links are engaged, and/or the nose wheel steering system is engaged, among others. Aircraft parking brakes are used to secure an aircraft and prevent the aircraft rolling when on the ground and wheel chocks are not in use. Towing an aircraft while the parking brake is engaged may damage the parking brake, the landing gear, the wheel, the aircraft fuselage and/or other components. Torque links connect telescopic cylinders and prevent relative rotation of pistons and cylinders to maintain wheel alignment of the nose wheel during taxiing of the aircraft on the ground. Towing the aircraft while the torque links are engaged may prevent the nose wheel from turning as needed during the towing operation, damaging the nose wheel, nose landing gear, and potentially other components. The nose wheel steering system is used to direct the aircraft during ground operations. Towing the aircraft while the nose wheel steering system is engaged may prevent the nose wheel from turning as needed by the towing machine and may damage the nose wheel, nose landing gear, and/or the steering system, among other components. Each of these errors may result in costly and time-consuming repairs to the aircraft. In some cases, damage to the landing gear may result in the aircraft being quarantined for a period of months during an investigation into the damage.

Currently, during towing operations, trained and authorized personnel are located in the aircraft cockpit to monitor the status of the aircraft and verbally communicate with the tow vehicle operator. This verbal communication generally occurs over an intercom that may be linked to the air traffic controller (ATC) as well. The tow vehicle operator waits for verbal clearance from the personnel in the cockpit before starting the towing service. The tow vehicle operator may stop all towing services in response to a loss of verbal communication. Checklist items that are communicated during a towing operation may include crew briefings, radio checks, ATC checks, clearances to tow, transponder checks, light checks, parking brake checks, acceleration checks, brake checks, and steering checks, among others. A miscommunication at any step of the towing operation may result in damage to the aircraft and/or injury to personnel up to and including the loss of life.

Disclosed herein is a smart aircraft towing system that provides a real time status of the aircraft being towed. The real time status includes a condition of the torque links, a condition of the nose wheel steering system, and the status of aircraft parking brake, among other information. In various embodiments, the real time status may be communicated from the aircraft to the tow vehicle via a wired medium and/or a wireless medium. In various embodiments, an aircraft mounted transmitter may communicate with the towing personnel via the wired medium and/or wireless medium. In various embodiments, the tow vehicle may be locked and inoperable until a clearance to move is received by the smart aircraft towing system. In various embodiments, the tow vehicle may include a mounted receiver connected to the tow vehicle that monitor a received status of the aircraft. In various embodiments, a handheld device may be used by towing personnel to receive towing status from the aircraft. In various embodiments, the mounted receiver and/or handheld receiver may subscribe to, or pair with, the aircraft mounted transmitter. In various embodiments, the communication between the transmitter and the receiver is encrypted. In various embodiments, each receiver pairs and/or subscribes to each transmitter. In various embodiments, the receiver includes a display and/or lights indicating the received status.

Figure 1A:
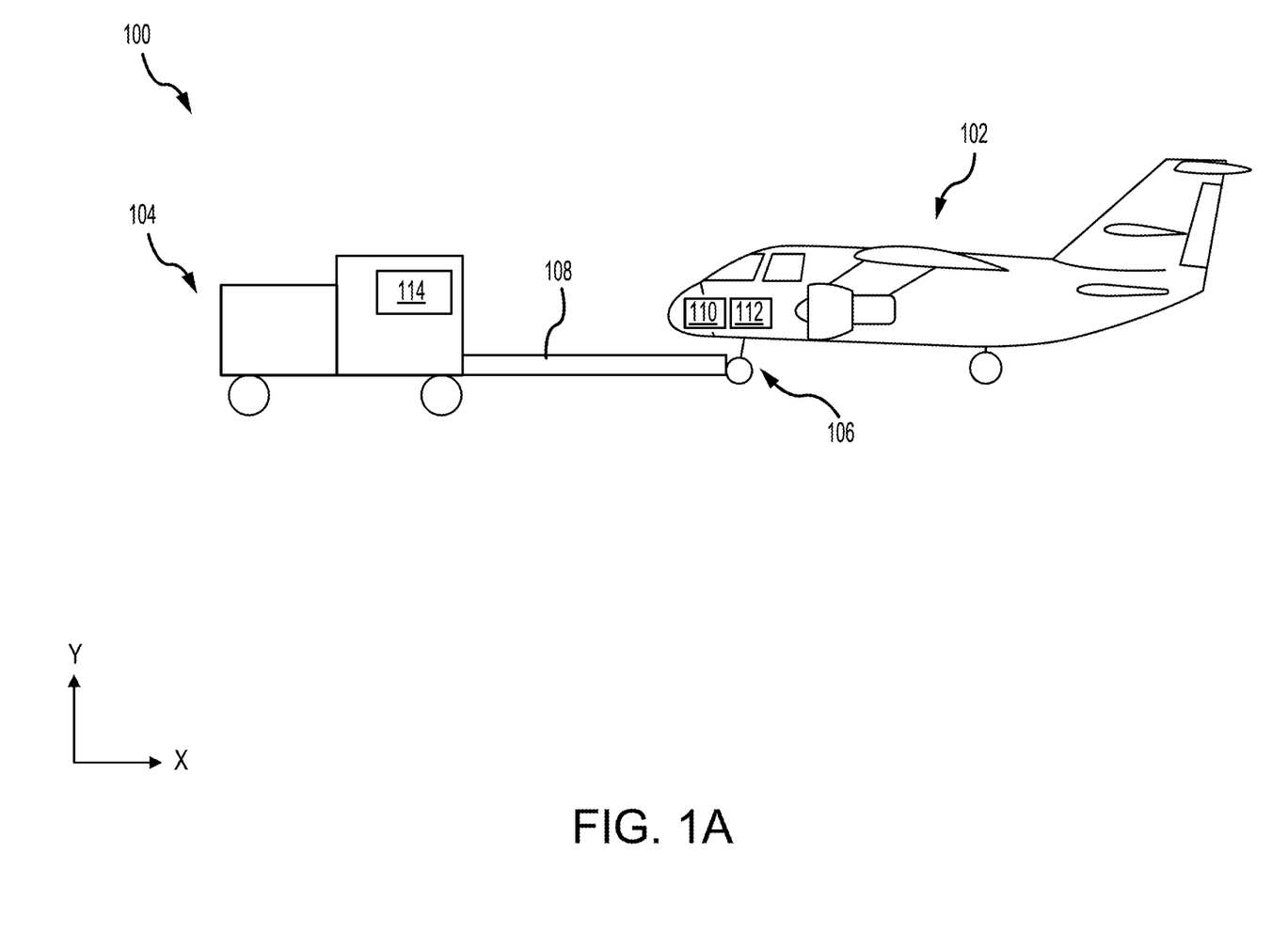
FIGS. 1A and 1B illustrate aircraft towing systems, in accordance with various embodiments.
Figure 1B:
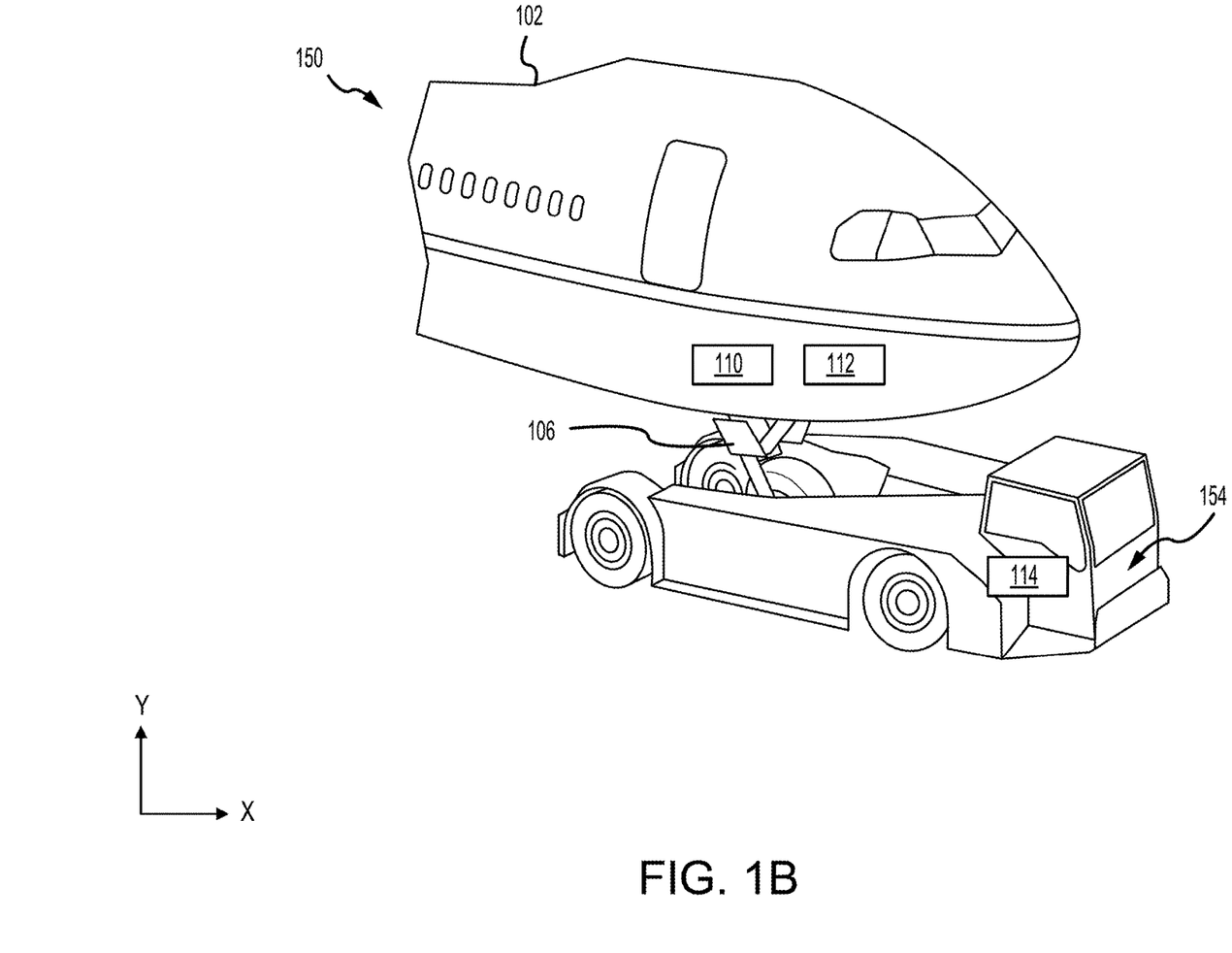

Referring now to FIGS. 1A and 1B, an aircraft towing system 100 and an aircraft towing system 150 are illustrated, respectively, in accordance with various embodiments. Referring first to FIG. 1A, aircraft towing system 100 includes an aircraft 102 and a tow truck 104. Aircraft 102 includes a nose landing gear 106 that is connected to tow truck 104 by a tow bar 108. Tow bar 108 connects to nose landing gear 106 allowing tow truck 104 to move aircraft 102. Aircraft 102 further includes avionics 110 and a towing system transmitter 112. Aircraft avionics 110 may include hardware and software systems and subsystems that receive and display a status of the various aircraft systems and subsystems. In various embodiments, the aircraft systems and subsystems may include parking brake status, nose wheel steering status, and torque link status, among others. Towing system transmitter 112 may communicate with avionics 110 to receive the status of various aircraft systems and transmit the status of the aircraft systems to subscribed and/or paired receivers.

Tow truck 104 further includes an aircraft towing system receiver 114. Aircraft towing system receiver 114 may be configured to receive aircraft status from towing system transmitter 112. In various embodiments, towing system receiver 114 may subscribe to towing system transmitter 112 in order to receive status updates from towing system transmitter 112. In various embodiments, towing system receiver 114 may pair with towing system transmitter 112 in order to receive status updates from towing system transmitter. In various embodiments, towing system receiver 114 may be integrated into tow truck 104. In various embodiments, the operation of tow truck 104 may be tied to the status received by towing system receiver 114. That is, tow truck 104 may be locked (e.g., not start, not move, etc.) in response to a status received by towing system receiver 114 being not clear to tow. Alternatively, tow truck 104 may be unlocked (e.g., able to start, move, etc.) in response to a status received by towing system receiver 114 being clear to tow. In various embodiments, towing system receiver 114 may further include an indicator of the status received. In various embodiments, the indicator may be a liquid crystal display (LCD), a number of light emitting diodes (LED), or LED display, among others. In various embodiments, towing system receiver 114 may be a handheld device that is separate from tow truck 104.

In various embodiments, towing system transmitter 112 communicates with towing system receiver 114 via a wired connection between tow truck 104 and aircraft 102. In various embodiments, the wired connection may be fiber-optic, coaxial, or twisted pair. In various embodiments, towing system transmitter 112 and towing system receiver 114 may communicate using an ethernet protocol, inter-integrated circuit (I2C) protocol, serial peripheral interface (SPI) bus protocol, or controller area network (CAN) protocol, among others.

In various embodiments, towing system transmitter 112 communicates with towing system receiver 114 via a wireless connection. In various embodiments, the wireless connection may be Bluetooth (IEEE 802.15.1), ZigBee (IEEE 802.15.4), Z-Wave, Wi-Fi (IEEE 802.11), among other protocols. In various embodiments, towing system transmitter 112 may provide an interface to which towing system receiver may subscribe in order to receive aircraft status updates. In various embodiments, towing system receiver 114 may pair with towing system transmitter 112 to communicate status information. In various embodiments, the communication between towing system transmitter 112 and towing system receiver 114 is encrypted. In various embodiments, towing system receiver 114 may be limited to communicating with a single towing system transmitter 112 while being paired and/or subscribed to multiple towing system transmitters 112.

Referring to FIG. 1B, aircraft towing system 150 includes aircraft 102 and a tow truck 154. Aircraft towing system 150 includes similar components to those described above with respect to aircraft towing system 100 including aircraft 102, nose landing gear 106, avionics 110, towing system transmitter 112, and towing system receiver 114. Aircraft towing system 150 further includes a towbar less tow truck 154. Tow truck 154 tows aircraft 102 using a hydraulic system to lift nose landing gear 106 off the ground. Similar precautions and communications are used by tow truck 154 when towing aircraft 102 as used by tow truck 104 described above. As such, the features of avionics 110, towing system transmitter 112, and towing system receiver 114 are not repeated here.

Figure 2:
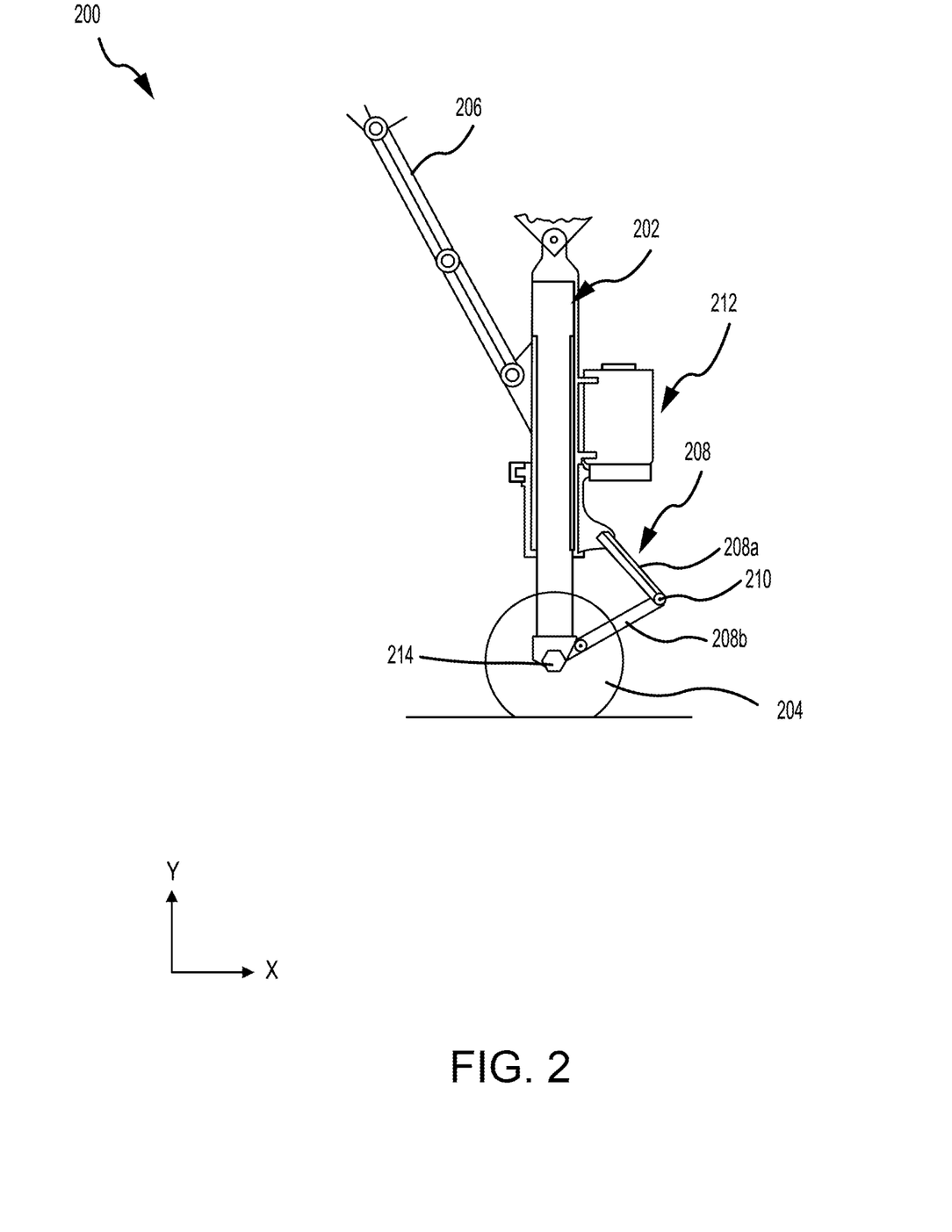
FIG. 2 illustrates a schematic view of a nose landing gear of an aircraft, in accordance with various embodiments.

Referring now to FIG. 2, a nose landing gear assembly 200 is illustrated, in accordance with various embodiments. Nose landing gear assembly 200 includes a shock strut assembly 202, a wheel 204, a drag brace 206, a torque link 208, a torque link pin 210 (also referred to as an apex pin), a steering system 212, and an axle 214. Shock strut assembly 202 may include a strut cylinder and a strut piston that is operatively coupled to the strut cylinder. Wheel 204 may be coupled to an axle at one end of shock strut assembly 202. In various embodiments, nose landing gear assembly 200 may include a torque link 208 coupled to shock strut assembly 202 and/or to wheel 204, including an axle. Torque link 208 includes a first, or upper, arm 208a and a second, or lower, arm 208b. First arm 208a is pivotably coupled to second arm 208b. Torque link pin 210 may be used to couple first arm 208a and second arm 208b to maintain alignment of wheel 204 during taxiing of aircraft 102 when on the ground. In various embodiments, axle 214 may be used to couple nose landing gear assembly 200 to tow truck 104. In various embodiments, torque link pin 210 may be used as axle 214, ensuring that the torque links are not engaged.

Nose landing gear assembly 200 may include one or more drag brace(s) such as drag brace 206. In various embodiments, drag brace 206 may be located proximate an aft side of shock strut assembly 202. In accordance with various embodiments, nose landing gear assembly 200 includes a nose-wheel steering system 212. Nose-wheel steering system 212 is operably coupled to wheel 204 via shock strut assembly 202. In this regard, and as described in further detail below, nose-wheel steering system 212 is configured to rotate shock strut assembly 202, thereby adjusting the orientation of the wheel 204 and the taxiing direction of the aircraft 102.

Figure 3:
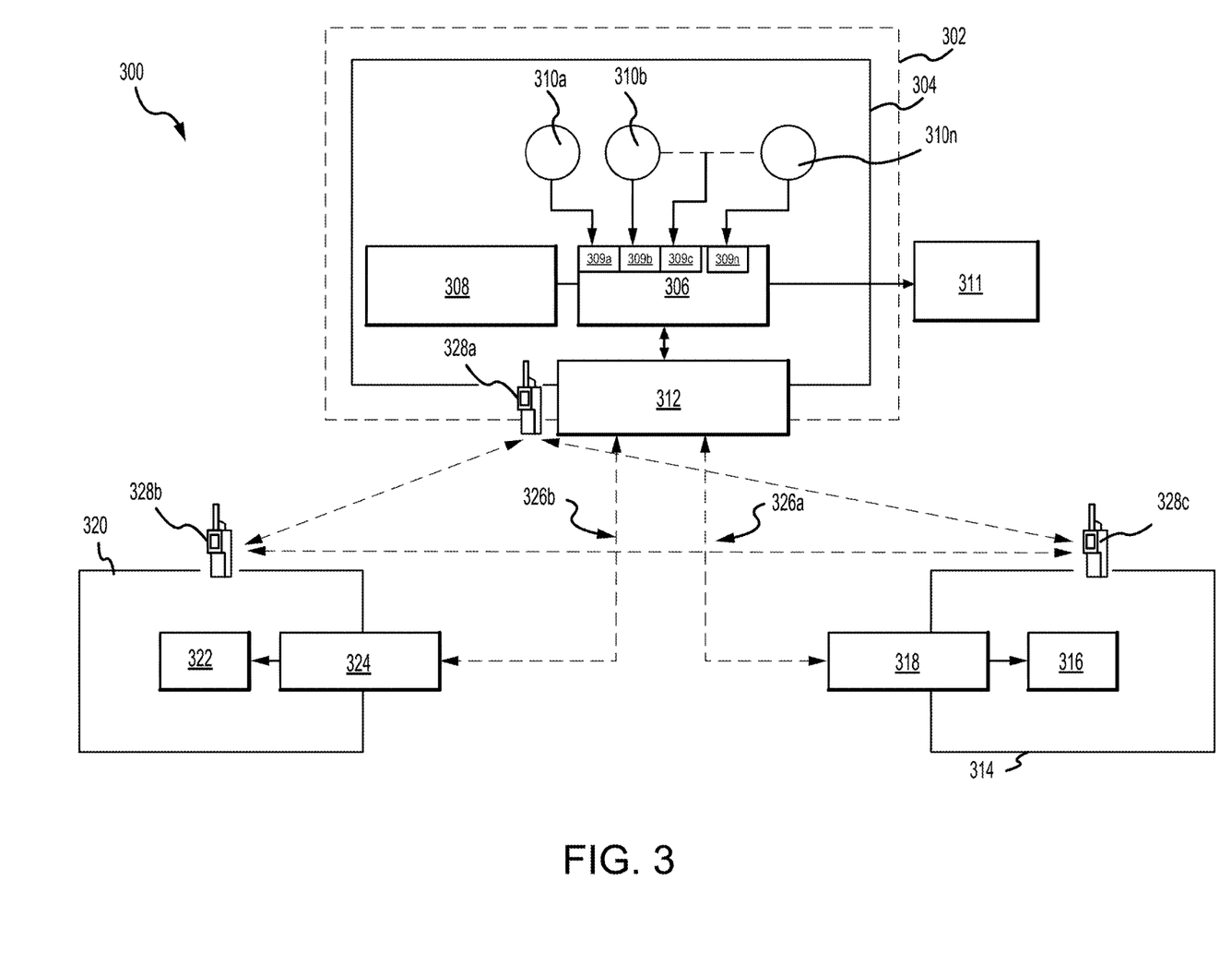
FIG. 3 illustrates a system diagram of an aircraft towing safety system, in accordance with various embodiments.

Referring now to FIG. 3, a towing system 300 for use on an aircraft (e.g., aircraft 102) is illustrated in accordance with various embodiments. Towing system 300 includes an aircraft avionics system 302, a tow truck controller 314, and an air traffic controller (ATC) controller 320. Aircraft avionics system 302 may include a towing controller 304 and a transmitter 312. Towing controller 304 includes a processor 306, a memory 308, and I/O 309a, 309b, . . . 309n. Towing controller 304 receives input from signals 310a, 310b, . . . 310n. Aircraft avionics system 302 and towing controller 304 may be examples of avionics 110 and towing system transmitter 112, respectively, describe above with respect to FIGS. 1A and 1B.

Processor 306 may comprise one or more processors configured to implement various logical operations in response to execution of instructions, for example, instructions stored on a non-transitory, tangible, computer-readable medium. The one or more processors can be a general-purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof.

Memory 308 may store data, executable instructions, system program instructions, and/or controller instructions to implement the control logic of controller 304. System program instructions and/or controller instructions may be loaded onto a non-transitory, tangible computer-readable medium (e.g., memory 308) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Towing controller 304 receives signals 310a, 310b, . . . 310n for processing. In various embodiments, towing controller 304 may receive signals 310a, 310b, . . . 310n and data from avionics 302. In various embodiments, towing controller 304 may receive signals 310a, 310b, . . . 310n and data from other systems and subsystems on the aircraft (e.g., aircraft 102). Signals 310a, 310b, . . . , 310n include signals from a parking brake sensor, a torque link sensor, and a nose wheel steering sensor. In various embodiments, signals 310a, 310b, . . . , 310n may further include discrete signals (e.g., weight on wheels) and/or avionics bus communications information (e.g., engine status, flight phase, etc.) In various embodiments, signals 310a, 310b, . . . , 310n may include any status and/or sensor information available on the aircraft. In various embodiments, a configuration file may be used to identity the sensors and/or signals from the aircraft to use to determine whether or not it is safe to tow the aircraft. Processor 306 may determine which inputs from signals 310a, 310b, . . . , 310n to process in based on the configuration file. Processor 306 receives signals 310a, 310b, . . . , 310n and determines a towing status based on the received signals 310a, 310b, . . . , 310n.

In various embodiments, towing controller 304 is connected to a display 311 to display the towing status. Towing controller 304, and more specifically, processor 306 may send a signal indicating the towing status to be output and/or displayed by display 311. In various embodiments, display 311 may be a liquid crystal display (LCD), one or more light emitting diodes (LED), or an LED display, among others. Display 311 may be located in a cockpit of the aircraft (e.g., 102) and be visible to trained personnel inside the cockpit.

Towing controller 304, and more specifically processor 306, may transmit the towing status to transmitter 312 for transmission any listening receivers (e.g., tow truck controller 314 and ATC controller 320). In various embodiments, transmitter 312 may transmit the towing status using a wired communication protocol, as previously described. In various embodiments, transmitter 312 may transmit the towing status using a wireless communication protocol, as previously described. For ease of description, the transmitter 312 will be described below as using a wireless communication protocol.

Tow truck controller 314 includes a processor 316 and a receiver 318. Receiver 318 may receive the towing status transmission from transmitter 312 (as indicated by line 326a) and forward the towing status to processor 316. As described above with respect to FIGS. 1A and 1B, processor 316 may be integrated into a tow truck (e.g., tow truck 104). Processor 316 may send signals to a display and/or prevent the tow truck from operating in response to receiving a status indicating the aircraft is not ready to be towed. Processor 316 may send signals to a display and/or allow the tow truck to operate in response to receiving a status indicating the aircraft is ready to be towed.

ATC Controller 320 includes a processor 322 and a receiver 324. Receiver 324 may receive the towing status transmission from transmitter 312 (as indicated by line 326b) and forward the towing status to processor 322. In various embodiments, ATC controller 320 may include a display indicating the towing status of the aircraft (e.g., aircraft 102). In various embodiments, ATC controller 320 may receive the same transmission from transmitter 312 as tow truck controller 314. In various embodiments, transmitter 312 may transmit a first signal to ATC controller 320 and a second signal to tow truck controller 314.

In various embodiments, aircraft personnel, tow truck operators, and ATC personnel may additionally communicate via radios 328a, 328b, 328c. In various embodiments, verbal communication between radio 328a and radios 328b, 328c may augment the towing status transmitted by transmitter 312 but not override the towing status. Accordingly, there is a reduction in human and/or communication error in determining the readiness of an aircraft for towing, resulting in fewer incidents and damages to the aircraft.

Similar to processor 306, processor 316 and processor 322 may each comprise one or more processors configured to implement various logical operations in response to execution of instructions, for example, instructions stored on a non-transitory, tangible, computer-readable medium. The one or more processors can be a general-purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof.

Processor 316 and processor 322 may each further comprise memory to store data, executable instructions, system program instructions, and/or controller instructions to implement the control logic of processor 316 and processor 322, respectively.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Figure 4:
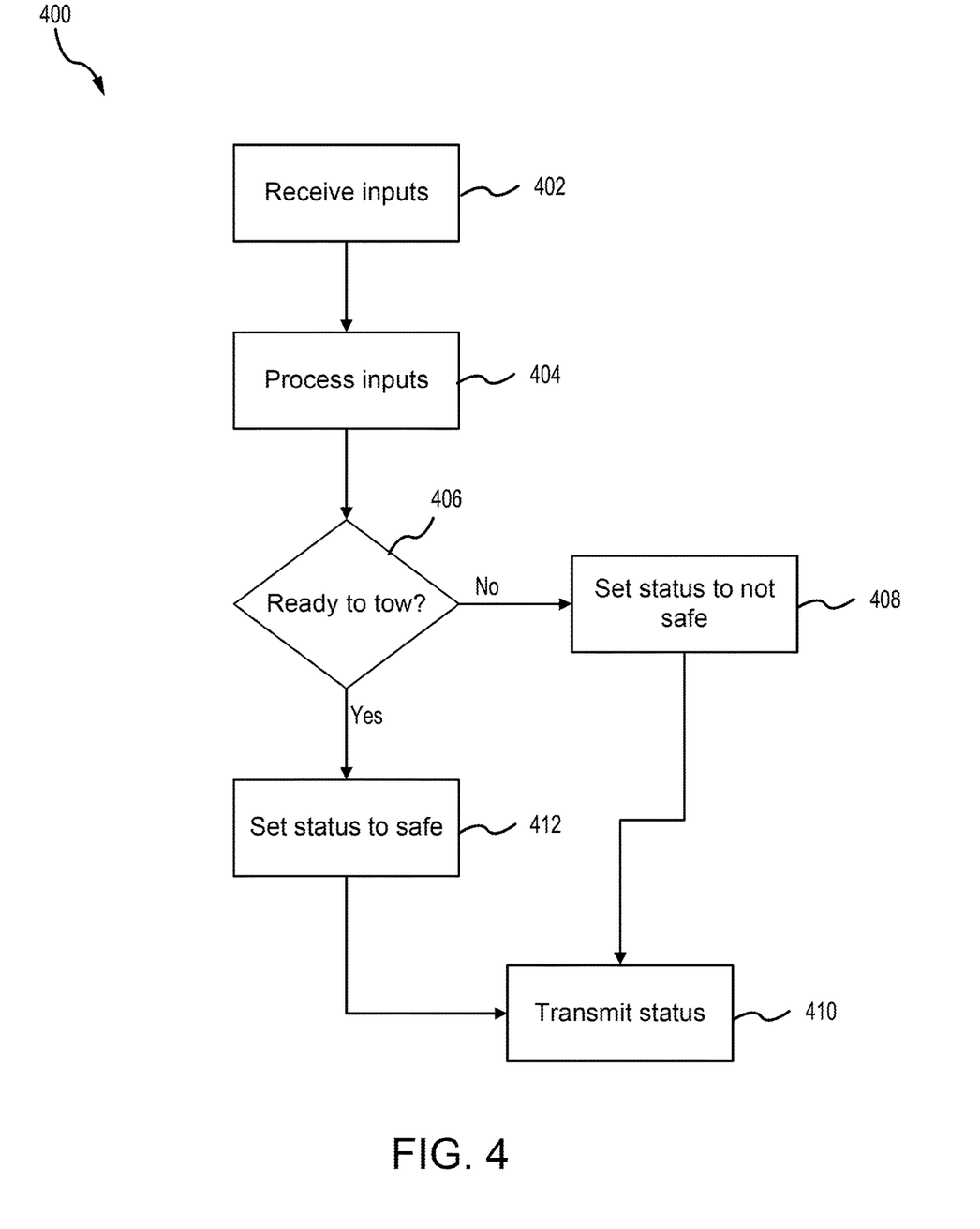
FIG. 4 illustrates a flow diagram of a method for using an aircraft safety towing system, in accordance with various embodiments.

Referring now to FIG. 4, a method 400 for determining an aircraft's readiness to be towed is illustrated, in accordance with various embodiments. The steps of method 400 may be performed by a controller, or processor, such as, for example, aircraft controller 320 described above with respect to FIG. 3. At block 402, controller 304 receives inputs from the aircraft. In various embodiments, the inputs may include data from a parking brake sensor, a torque link sensor, and a nose wheel steering sensor, as previously described. In various embodiments, the inputs from the aircraft may further include weight on wheels information, engine status, flight phase, and/or any other available information or status provided by the aircraft. At block 404, the controller 304 processes the received inputs to determine whether or not the aircraft is ready to be towed. In other words, controller 304 determines whether it is safe to tow the aircraft in response to the inputs received. At decision block 406, if it is determined that it is not safe to tow the aircraft, method 400 proceeds to block 408. At block 408, controller 304 sets the tow status to not safe, indicating that the aircraft is not ready to be towed. At block 410, controller 304 transmits the tow status to any listening receivers. Returning to decision block 406, if instead it is determined that it is safe to tow the aircraft, method 400 proceeds to block 412. At block 412, controller 304 sets the tow status to safe, indicating that the aircraft is ready to be towed. Method 400 then proceeds to block 410 to transmit the tow status of the aircraft.

Figure 5:
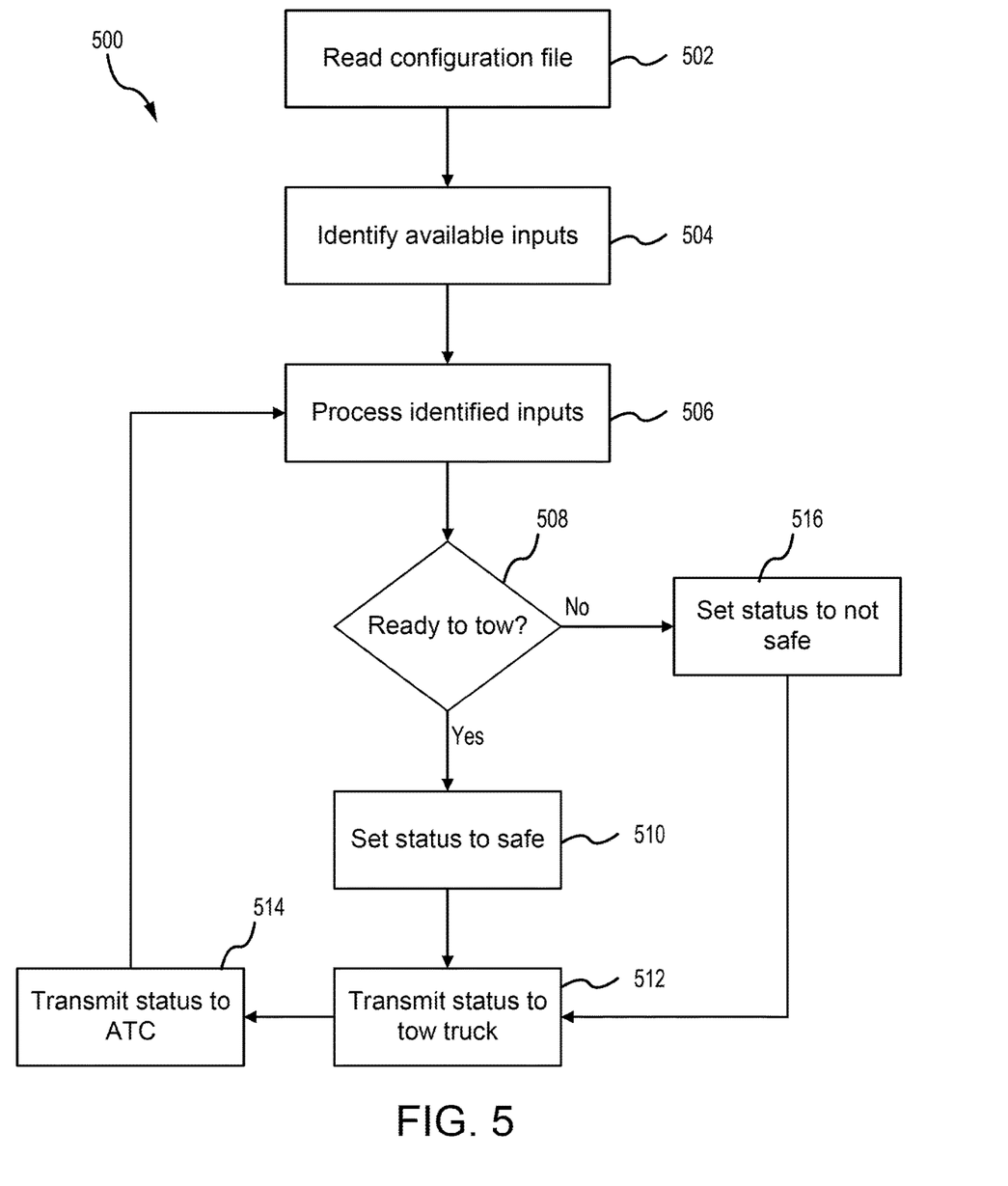
FIG. 5 illustrates a flow diagram of a method of setting a towing status using an aircraft towing safety system, in accordance with various embodiments.

Referring now to FIG. 5, a method 500 for communicating an aircraft's readiness to be towed is illustrated, in accordance with various embodiments. The steps of method 500 may be performed by a controller, or processor, such as, for example, aircraft controller 320 described above with respect to FIG. 3. At block 502, controller 304 reads a configuration file that identifies the inputs to be used to determine whether the aircraft is ready to be towed. In various embodiments, the inputs may include data from a parking brake sensor, a torque link sensor, and a nose wheel steering sensor, as previously described. In various embodiments, the inputs from the aircraft may further include weight on wheels information, engine status, flight phase, and/or any other available information or status provided by the aircraft. Using a configuration file reduces the number of changes to the tow system during installation in different aircraft, thereby improving portability of the tow system. At block 504, controller 304 identifies available inputs from the aircraft based on the configuration file. At block 506, the controller 304 processes the identified inputs to determine whether or not the aircraft is ready to be towed. In other words, controller 304 determines whether it is safe to tow the aircraft in response to the inputs received.

At decision block 508, if it is determined that it is safe to tow the aircraft, method 500 proceeds to block 510. At block 510, controller 304 sets the tow status to safe, indicating that the aircraft is ready to be towed. At block 512, controller 304 transmits the tow status to a tow truck receiver (e.g., tow truck controller 314). In various embodiments, the tow truck receiver may be subscribed to receive status information. In various embodiments, the tow truck receiver may be wirelessly paired with controller 304. At block 514, controller 304 transmits the tow status to an air traffic controller (ATC) receiver (e.g., ATC controller 320). In various embodiments, the ATC receiver may be subscribed to receive status information. In various embodiments, the ATC receiver may be wirelessly paired with controller 304. Method 500 then returns to block 506 to continue monitoring the towing status. Returning to decision block 508, if instead it is determined that it is not safe to tow the aircraft, method 500 proceeds to block 516. At block 516, controller 304 sets the tow status to not safe, indicating that the aircraft is not ready to be towed. Method 500 then proceeds to block 512 as described above.

Figure 6:
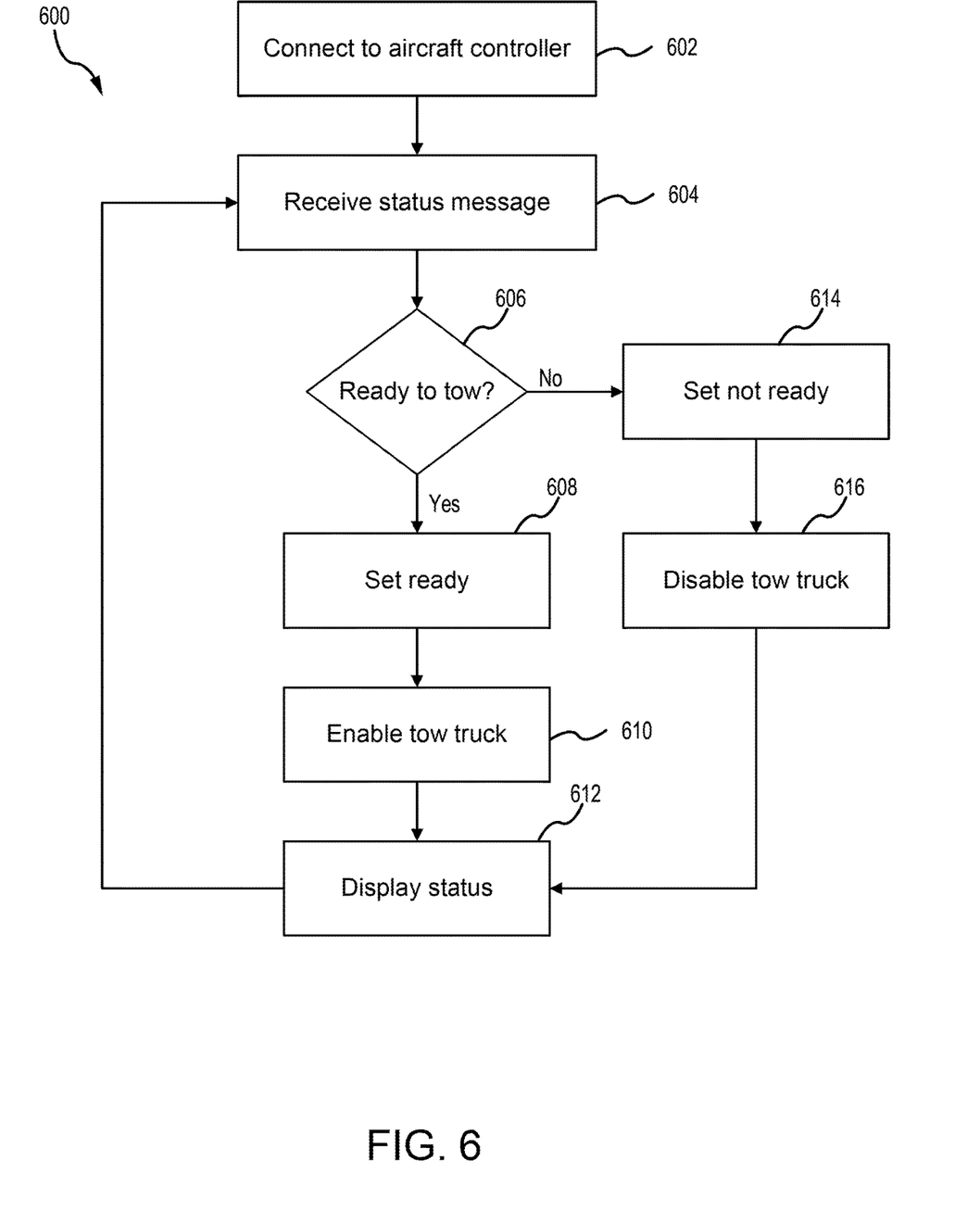
FIG. 6 illustrates a flow diagram of a method of receiving a towing status using an aircraft towing safety system, in accordance with various embodiments.

Referring now to FIG. 6, a method 600 for monitoring an aircraft's readiness to be towed is illustrated, in accordance with various embodiments. The steps of method 600 may be performed by a controller, or processor, such as, for example, tow truck controller 314 described above with respect to FIG. 3. At block 602, controller 314 connects to the aircraft's controller (e.g., controller 304). In various embodiments, connecting to the aircraft controller may include subscribing to receive status information. In various embodiments, connecting to the aircraft controller may including wirelessly pairing with the aircraft controller to communicate. At block 604, controller 314 receives a status message indicating the towing status of the aircraft. At decision block 606, controller 314 determines whether the aircraft is ready to be towed. If it is determined that the aircraft is ready to be towed, method 600 proceeds to block 608. At block 608, controller 314 sets the towing status to ready. At block 610, controller 314 enables the tow truck (e.g., tow truck 104) to tow the aircraft. In various embodiments, enabling the tow truck may include permitting the tow truck to start up after connecting to the aircraft. At block 612, controller 314 displays the towing status. In various embodiments, the towing status may be displayed on an LCD screen, one or more LEDs, or another medium. Method 600 then proceeds to block 604 to await transmission of the next status message.

Returning to decision block 606, if instead, it is determined that the aircraft is not ready to be towed, method 600 proceeds to block 614. At block 614, controller 314 sets the towing status to not ready. At block 616, controller 314 disables the tow truck (e.g., tow truck 104). In various embodiments, disabling the tow truck may include preventing the tow truck from starting up after connecting to the aircraft. Method 600 then proceeds to block 612.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method, comprising:
   receiving, by a processor, an input from an aircraft avionics system of an aircraft, wherein the input includes a parking brake sensor input, a torque link sensor input, and a nose wheel steering sensor input;
   determining, by the processor, a towing status of the aircraft based on the input;
   sending, by the processor, a message to a transmitter to transmit the towing status of the aircraft;
   receiving, by a second processor, the towing status of the aircraft;
   controlling, by the second processor, an operational status of a tow truck;
   allowing, by the second processor, the tow truck to operate in response to receiving a status indicating the aircraft is ready to be towed; and
   preventing, by the second processor, the tow truck from operating in response to receiving a status indicating the aircraft is not ready to be towed.

2. The method of claim 1, further comprising:
   reading, by the processor, a configuration file associated with the aircraft; and
   identifying, by the processor, before the determining, a number of sensor inputs to be received based on the configuration file, wherein the input includes the number of sensor inputs.

3. The method of claim 1, wherein the sending the message further includes:
   identifying, by the processor, a first recipient of the towing status and a second recipient of the towing status; and
   sending, by the processor, a message to transmit the towing status to the first recipient and the second recipient.

4. The method of claim 3, wherein the first recipient is a tow truck controller and the second recipient an air traffic controller (ATC) controller.

5. The method of claim 4, further comprising:
   receiving, by the processor, a request to subscribe to the towing status of the aircraft; and
   determining, by the processor, to send the message in response to the request to subscribe.

6. The method of claim 1, wherein the transmitter is a wireless transmitter.

7. A system, comprising:
   an aircraft including:
      an avionics system,
      a nose landing gear,
      a first controller configured to determine a towing status of the aircraft based on a parking brake sensor input; a torque link sensor input; and a nose wheel steering sensor input received from the aircraft avionics system, and
      a transmitter configured to transmit the towing status;
   a receiver associated with a tow truck and configured to receive the towing status; and
   a second controller configured to allow or prevent operation of the tow truck based on the towing status.

8. The system of claim 7, wherein
   the tow truck includes a second controller, wherein the receiver is configured to receive the towing status from the transmitter, and the second controller is configured to provide an indication of the towing status of the aircraft,
   the second controller is further configured to subscribe to the first controller to receive the towing status, and
   the transmitter is configured to transmit the towing status to subscribed receivers.

9. The system of claim 8, wherein the second controller is further configured to prevent movement of the tow truck in response to the towing status indicating the aircraft is not ready to be towed.

10. The system of claim 8, wherein the second controller is further configured to allow movement of the tow truck in response to the towing status indicating the aircraft is ready to be towed.

11. The system of claim 8, wherein the tow truck further includes a display configured to display the towing status received from the second controller.

12. The system of claim 8, further comprising:
    a third controller including a receiver, the third controller configured to receive the towing status from the aircraft.

13. The system of claim 7, wherein the receiver is configured to pair with the transmitter.

14. A system, comprising:
an aircraft including a plurality of sensors;
a transmitter;
a first processor;
a memory operatively coupled to the first processor, the memory comprising instructions stored thereon that, when executed by the first processor, cause the processor to:
   receive an input from the plurality of sensors;
   determine a towing status of the aircraft based on the input; and
   send a message to the transmitter to transmit the towing status of the aircraft;
a receiver configured to receive the towing status of the aircraft from the transmitter; and
a second processor configured to:
   receive the towing status of the aircraft from the receiver;
   control an operational status of a tow truck;
   allow the tow truck to operate in response to receiving a status indicating the aircraft is ready to be towed; and
   prevent the tow truck from operating in response to receiving a status indicating the aircraft is not ready to be towed.

15. The system of claim 14, wherein the instructions, when executed by the processor, further cause the processor to:
   read a configuration file associated with the aircraft; and
   identify, before the determining, a subset of the plurality of sensors to use to determine the towing status, the subset of the plurality of sensors being based on the configuration file.

16. The system of claim 14, wherein the plurality of sensors includes a parking brake sensor input, a torque link sensor input, and a nose wheel steering sensor input.

17. The system of claim 14, wherein the instructions, when executed by the processor, further cause the processor to:
   identify a recipient of the towing status based on a list of subscribers; and
   transmit the towing status to the recipient.

18. The system of claim 14, wherein the aircraft further includes a towing status indicator, and wherein the instructions, when executed by the processor, further cause the processor to:
   send a signal including the towing status to the towing status indicator.

19. The system of claim 18, wherein the towing status indicator is a liquid crystal display or a light emitting diode.

* * * * *